(12) United States Patent
Stegall

(10) Patent No.: US 8,665,862 B1
(45) Date of Patent: Mar. 4, 2014

(54) PERFORMING CROSS-DOMAIN DEREGISTRATION

(75) Inventor: Mark A. Stegall, Melissa, TX (US)

(73) Assignee: Apple Inc., Cupertino, CA (US)

( * ) Notice: Subject to any disclaimer, the term of this patent is extended or adjusted under 35 U.S.C. 154(b) by 1601 days.

(21) Appl. No.: 11/585,735

(22) Filed: Oct. 24, 2006

Related U.S. Application Data

(60) Provisional application No. 60/729,525, filed on Oct. 24, 2005.

(51) Int. Cl.
*H04L 12/66* (2006.01)

(52) U.S. Cl.
USPC ............................ 370/352; 370/354; 370/331

(58) Field of Classification Search
USPC .......................................... 370/352, 357, 331
See application file for complete search history.

(56) References Cited

U.S. PATENT DOCUMENTS

| | | | | |
|---|---|---|---|---|
| 6,625,141 | B1 * | 9/2003 | Glitho et al. | 370/352 |
| 6,718,178 | B1 * | 4/2004 | Sladek et al. | 455/466 |
| 6,763,233 | B2 * | 7/2004 | Bharatia | 455/433 |
| 2002/0067707 | A1 * | 6/2002 | Morales et al. | 370/331 |
| 2004/0199649 | A1 * | 10/2004 | Tarnanen et al. | 709/230 |
| 2004/0203763 | A1 * | 10/2004 | Tammi | 455/435.1 |
| 2006/0019659 | A1 * | 1/2006 | Rosenberg et al. | 455/432.1 |
| 2006/0064307 | A1 * | 3/2006 | Pakkala | 705/1 |
| 2006/0114882 | A1 * | 6/2006 | Mills | 370/352 |
| 2006/0264213 | A1 * | 11/2006 | Thompson | 455/433 |

FOREIGN PATENT DOCUMENTS

EP    1827034    * 12/2005

OTHER PUBLICATIONS

3GPP TS 33.210 v7.0.0 (Dec. 2005), $3^{rd}$ Generation Partnership Project; Technical Specification Group Services and System Aspects; 3G Security; Network Domain Security; IP Network Layer Security (Release 7); pp. 1-21 (2005).
3GPP TS 23.002 v7.1.0 (Mar. 2006), $3^{rd}$ Generation Partnership Project; Technical Specification Group Services and Systems Aspects; Network Architecture (Release 7); pp. 1-61 (2006).
3GPP TS 23.228 v7.4.0 (Jun. 2006), $3^{rd}$ Generation Partnership Project; Technical Specification Group Services and System Aspects; IP Multimedia Subsystem (IMS); Stage 2 (Release 7); pp. 1-197 (2006).
3GPP2 X.P0042-001-0 v0.84, $3^{rd}$ Generation Partnership Project 2 "3GPP2," Voice Call Continuity between IMS and Circuit Switched Sytems—Stage 2; pp. 1-52 (Aug. 2006).
Network Working Group, Request for Comments 3261, "SIP: Session Initiation Protocol," pp. 1-269 (Jun. 2002).
Network Working Group, Request for Comments 3265, "Session Initiation Protocol (SIP)—Specific Event Notification," pp. 1-38 (Jun. 2002).

* cited by examiner

*Primary Examiner* — Robert Wilson
*Assistant Examiner* — Pamit Kaur
(74) *Attorney, Agent, or Firm* — Meyertons, Hood, Kivlin, Kowert & Goetzel, P.C.

(57) ABSTRACT

A mobile station attached to a first type service domain determines that the mobile station should deregister in a second, different type service domain. In response to the determination to deregister, a deregistration request is sent through the first type service domain. The deregistration request indicates that the mobile station is to be deregistered in the second type service domain.

21 Claims, 3 Drawing Sheets

PERFORMING CROSS-DOMAIN DEREGISTRATION

CROSS-REFERENCE TO RELATED APPLICATION

This claims the benefit under 35 U.S.C. §119(e) of U.S. Provisional Application Ser. No. 60/729,525, entitled "PS Deregistration Via CS," filed Oct. 24, 2005, which is hereby incorporated by reference.

TECHNICAL FIELD

The invention relates generally to deregistering the mobile station across different types of domains, where the different types of domains include a circuit-switched domain and a packet-switched domain.

BACKGROUND

Mobile or wireless communications networks are capable of carrying circuit-switched and packet-switched traffic (e.g., voice traffic, data traffic, etc.) between mobile stations and other endpoints, which can be another mobile station or an endpoint connected to a network such as a public-switched telephone network (PSTN) or a packet data network. Traditional wireless protocols provide for circuit-switched communications, such as the circuit-switched protocol provided by 1xRTT, defined by CDMA 2000. With circuit-switched communications, a dedicated circuit or channel is established between nodes and terminals to allow communication between endpoints. Each circuit that is dedicated cannot be used by other users until the circuit or channel is released.

In contrast, with packet-switched communications, data is split into packets, with the packets routed individually over one or more paths. A widely-used form of packet-switched communications is defined by the Internet Protocol (IP). Examples of packet-switched communications that are possible over data networks include electronic mail, web browsing, file downloads, electronic commerce transactions, voice or other forms of real-time, interactive communications, and others. To enable the establishment of packet-switched communications sessions in a network, various control functions (implemented with software and/or hardware) are deployed in the network. Some standards bodies have defined subsystems within communications networks that include such control functions. One such standards body is the Third Generation Partnership Project (3GPP), which has defined an Internet Protocol (IP) multimedia subsystem (IMS) that includes various control functions for provision of IP multimedia services, including audio, video, text, chat, or any combination of the foregoing.

In the 3GPP2 context, the equivalent of the IP multimedia subsystem is sometimes referred to as a multimedia domain (MMD) network. The term "multimedia network" is used to generally refer to any one of an IP multimedia subsystem, MMD network, or any other network in which multimedia communications (any one or more of video, audio, text, chat, e-mail, web browsing, etc.) are possible.

To provide wireless access to a multimedia network, a wireless access network according to any of the following standards can be used: 1xEV-DO or 1xEV-DV (which are defined by the CDMA 2000 family of standards), WiFi (which is a wireless local area network or WLAN technology defined by the IEEE 802.11 specifications), and WiMAX (Worldwide Interoperability for Microwave Access) (which is also a WLAN technology defined by the IEEE 802.16 specifications). Note that 1xRTT also provides packet-switched communications, in addition to circuit-switched communications.

It is common for circuit-switched access networks (such as those based on 1xRTT) to coexist with packet-switched access networks for multimedia networks. Certain mobile stations are able to operate with both circuit-switched wireless access networks and packet-switched wireless networks, either sequentially or simultaneously. Such mobile stations are referred to as multi-mode mobile stations or multi-mode handsets.

If the multi-mode mobile station is no longer able to communicate over a particular one of the service domains (either a circuit-switched service domain or packet-switched service domain), such as due to loss of the wireless connection, then the mobile station would not be able to deregister itself in the particular service domain. As a result, the particular service domain may contain stale registration information, which can cause unnecessary use of resources and delay in call setup when the particular domain attempts to contact the mobile station that has lost its connection with the particular service domain.

SUMMARY

In general, cross-domain deregistration is possible for a mobile station, where the mobile station is able to send a deregistration indication through one type of service domain to deregister the mobile station in another type of service domain.

Other or alternative features will become apparent from the following description, from the drawings, and from the claims.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1:
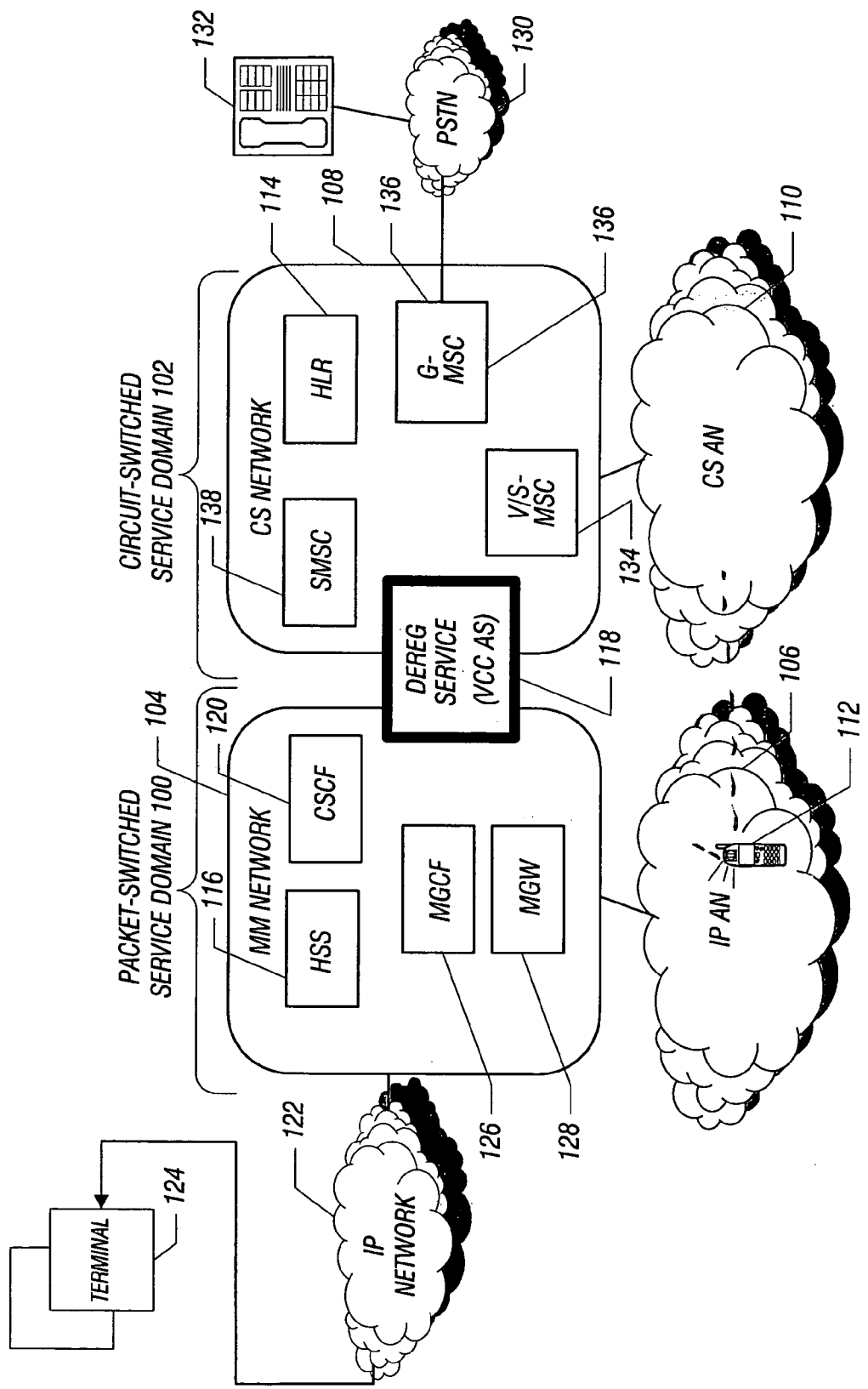
FIG. 1 is a block diagram of an arrangement that includes plural types of service domains, including a circuit-switched service domain and a packet-switched service domain in which cross-domain deregistration can be performed in accordance with some embodiments.

FIG. 1 illustrates a communications system that has plural different types of service domains. In FIG. 1, the plural different types of service domains include a packet-switched service domain 100 and a circuit-switched service domain 102. The packet-switched service domain 100 includes a multimedia network 104 and a packet-switched access network 106, and the circuit-switched service domain 102 includes a circuit-switched core network 108 and a circuit-switched access network 110. A multi-mode mobile station 112 is able to communicate over either the packet-switched access network 106 or circuit-switched access network 110, or alternatively, the mobile station 112 is able to operate over both the packet-switched access network 106 and circuit-switched access network 110. A multi-mode mobile station is a mobile station that is able to operate over different types of access networks. The multi-mode mobile station 112 can also transfer between the packet-switched and circuit-switched service domains depending on conditions in the corresponding packet-switched and circuit-switched access networks. Although only one mobile station 112 is depicted, it is noted that multiple mobile stations are typically present in a communications system.

Examples of the packet-switched access network 106 include one or more of the following: 1xEV-DO or 1xEV-DV access network according to CDMA (code-division multiple access 2000, also referred to as HRPD (high rate packet data)); a wireless local area network (WLAN) access network, such as that defined by WiFi (IEEE 802.11a, 802.11b, or 802.11g) or by WiMax (IEEE 802.16 or 802.16a); and a Universal Mobile Telecommunications System (UMTS) packet-switched access network based on wideband code-division multiple access (W-CDMA). Other types of packet-switched wireless access networks can also be employed in other implementations.

Examples of the circuit-switched access network 110 include a 1xRTT (also defined by CDMA 2000) access network, a Global System for Mobile (GSM)-based circuit-switched access network, or another type of circuit-switched access network that is based on either CDMA technology or time division of multiple access (TDMA) technology.

The multimedia network 104 can be any network that has control functions to provide packet-switched multimedia services. Control functions in the multimedia network are able to exchange packet-switched messaging (packet-switched call control messaging such as Session Initiation Protocol or SIP messaging) to establish or control a packet-switched multimedia call session. A "multimedia call session" or "call session" refers to any session for communicating any one or more of voice, other audio, video, text, chat, and others. A "control function" refers to hardware and/or software for performing call control tasks to enable establishment of multimedia call sessions. Examples of multimedia networks include the Internet Protocol (IP) multimedia subsystem (IMS) defined by 3GPP (Third Generation Partnership Project), the multimedia domain (MMD) network provided by 3GPP2, or any other network in which multimedia communications can be performed.

SIP is an application-layer control signaling protocol for creating, modifying, and terminating multimedia sessions (any one or more of a voice session, other audio session, video session, text session, chat session, or any combination of the foregoing). SIP is used as the call control signaling protocol by various control functions in the multimedia network 104. SIP is described in Request for Comments (RFC) 3261, entitled "SIP: Session Initiation Protocol," dated June 2002.

In accordance with some embodiments, the multi-mode mobile station 112 is able to perform registration in both the packet-switched service domain 100 and the circuit-switched service domain 102 (dual registration). In the example depicted in FIG. 1, the mobile station 112 is able to perform registration with both the home location register (HLR) 114 that is part of the circuit-switched service domain 102 and a home subscriber server (HSS) 116/serving call session control function (S-CSCF) 120 that is part of the packet-switched service domain 100. The HLR 114 is the central database used in the circuit-switched service domain 102 that contains details of each mobile station subscriber that is authorized to use the circuit-switched service domain. The combination of the S-CSCF 120 and the HSS 116 is the equivalent of the HLR in the packet-switched service domain 100.

A technique according to some embodiments allows the mobile station 112 that is actively registered in two different types of service domains but which has access to just one of the service domains to trigger a deregistration to the other service domain (the service domain to which the mobile station has lost connection). A cross-domain registration state change (deregistration) can be triggered by the mobile station 112.

Deregistration of the mobile station 112 may be performed in response to one or more triggers, including: disabling of one of the radio interfaces of the multi-mode mobile station to conserve battery life when the mobile station no longer has access to the corresponding one of the service domains (e.g., disabling of the circuit-switched radio interface when the mobile station has lost access to the circuit-switched service domain); powering down of the mobile station; loss of wireless connection to a packet-switched or circuit-switched access network; and any event for controlling a method of service delivery to the mobile station. If the trigger to deregister is loss of wireless connection to the packet-switched or circuit-switched access network, then a timer function can be provided in the mobile station 112 to wait some predefined time period before starting the deregistration procedure, just in case the wireless connection is re-established shortly after the loss of the wireless connection.

Cross-domain deregistration can be triggered automatically within the mobile station upon detecting a particular condition that indicates the mobile station should deregister in one type of service domain using a deregistration request sent over another type of service domain. Alternatively, the mobile station can perform the cross-domain deregistration in response to user input (such as the user making a selection at the mobile station that deregistration is to be performed in either the circuit-switched service domain or packet-switched service domain).

The ability to perform cross-domain deregistration reduces the likelihood that a service domain may contain stale registration of a particular mobile station. Eliminating stale registrations allows for enhanced network performance since unnecessary paging of mobile stations based on stale registrations is avoided or reduced. As noted above, battery life of the mobile station can also be extended by allowing a radio interface associated with the service domain in which the mobile station has deregistered to be turned off. A further benefit is that the speed in which calls to mobile stations can be processed can be increased since unnecessary paging is eliminated or reduced.

FIG. 1 illustrates a deregistration service node 118 in accordance with some embodiments that enables the performance of cross-domain deregistration. In one embodiment, the deregistration service node 118 is provided as part of an application server in the multimedia network 104. In one specific example, the deregistration service node 118 is part of a voice call continuity (VCC) application server. However, in other implementations, the deregistration service node 118 can be provided in other functions or nodes within the multimedia network 104. To perform cross-domain deregistration, the mobile station 112 sends a deregistration request (over either the packet-switched access network 106 or circuit-switched access network 110), which causes some indication to be provided to the appropriate one of the HLR 114 or HSS 116/S-CSCF 120 in the service domain in which the deregistration is desired. The details of the flows to perform cross-domain deregistration are described further below.

FIG. 1 shows additional functions in each of the multimedia network 104 and circuit-switched core network 108. The multimedia network 104 further includes one or more call session control functions (CSCFs), which can include the serving CSCF (S-CSCF) 120, a proxy CSCF (P-CSCF) (not shown), and an interrogating CSCF (I-CSCF) (not shown). A P-CSCF is the first call control contact point for a terminal, such as the mobile station 112, in a multimedia network. The P-CSCF further communicates call control signaling, such as SIP call control messages, with an I-CSCF or an S-CSCF. An I-CSCF is the contact point within a service operator's network for connections destined to users in the service operator's network. Example tasks performed by the I-CSCF include handling initial registration by interrogating a HSS, routing of a call control message received from another network towards an S-CSCF, and other tasks. The S-CSCF 120 handles session control within the multimedia network on behalf of terminals.

As further depicted in FIG. 1, the multimedia network 104 is connected to an Internet Protocol (IP) network 122, to which various terminals 124 are connected. A packet-switched call session can thus be established between the mobile station 112 and a terminal 124 through the multimedia network 104 and the IP network 122.

The multimedia network 104 also includes a media gateway control function (MGCF) 126, which performs call control protocol conversion between a packet-switched call control message (e.g., SIP message) and a circuit-switched call control message, such as a message according to an ISUP (ISDN User Part) protocol that is part of Signaling System No. 7 (SS7). The MGCF 126 controls a media gateway (MGW) 128 that converts between packet-switched bearer traffic and circuit-switched bearer traffic. Bearer traffic is communicated through the media gateway 128 between a terminal attached to the IP network 122 or the packet-switched access network 106 and a terminal attached to the circuit-switched access network 110 or a public switched telephone network (PSTN) 130. As depicted by FIG. 1, a terminal 132 is connected to the PSTN 130.

The circuit-switched core network 108 includes a visited or serving mobile switching center (MSC) 134. The MSC 134 can serve a mobile station (e.g., mobile station 112) when the mobile station is attached to the circuit-switched access network 110. The circuit-switched core network 108 also includes a gateway MSC 136 that is connected to the PSTN 130. In other implementations, the gateway MSC 136 can be omitted.

The circuit-switched core network 108 also includes a short message service (SMS) center (SMSC) 138. The short message service allows a mobile station to send short messages (also known as text messages) between mobile stations, or between mobile stations and landline terminals. The SMSC 138 is the network element in the circuit-switched core network 108 that delivers SMS messages. When a mobile station sends an SMS message to another user, the mobile station actually sends the SMS message to the SMSC 138, which stores the message and delivers the message to the destination user when the destination user is available. In an alternative embodiment, the SMSC 138 can be implemented as an SMS gateway on the edge of the multimedia network 104.

In accordance with some embodiments, to perform deregistration in the packet-switched service domain 100 of a mobile station attached to the circuit-switched service domain 102, the mobile station in the circuit-switched service domain sends an SMS message containing a deregistration request through the circuit-switched access network 110 to the SMSC 138, which then interacts with the deregistration service node 118 to perform deregistration in the packet-switched service domain 100.

On the other hand, to deregister the mobile station in the circuit-switched service domain 102 when the mobile station is attached to the packet-switched service domain 100, the mobile station in the packet-switched service domain sends a notification, such as a SIP Notify message, to the deregistration service node 118. The deregistration service node 118 then interacts with the HLR 114 in the circuit-switched service domain 102 to deregister the mobile station in the circuit-switched service domain.

Figure 2:
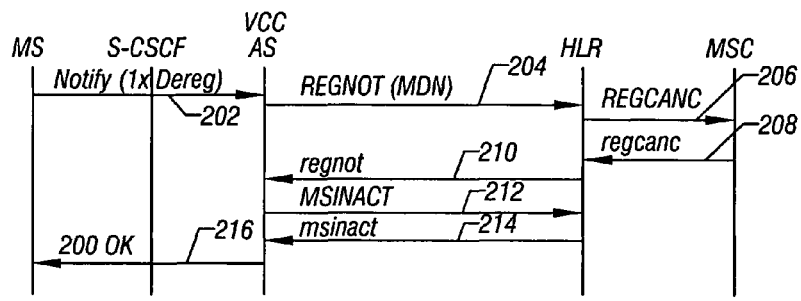
FIG. 2 is a message flow diagram of a procedure to deregister a multi-mode mobile station in the circuit-switched service domain by using the packet-switched access network, according to an embodiment.

FIG. 2 shows an example message flow for deregistering a mobile station 112 in the circuit-switched service domain 102 by sending a deregistration request through a packet-switched service domain. To deregister in the circuit-switched service domain when the mobile station is not attached to the circuit-switched access network 110, the mobile station 112 sends (at 202) a SIP Notify message to the multimedia network 104. More specifically, in the example of FIG. 2, the Notify message is sent to the VCC AS, which in this example is assumed to contain the deregistration service node 118 (FIG. 1). In other implementations, the deregistration service node 118 can be a stand-alone node or part of another node in the multimedia network 104. The SIP Notify message is used to provide notification of occurrence of an event that has been subscribed to by a mobile station, where the subscription uses a SIP Subscribe message. The SIP Subscribe and Notify methods are described in RFC 3265, entitled "Session Initiation Protocol (SIP)—Specific Event Notification," dated June 2002.

Although not shown in FIG. 2, the VCC AS had previously sent a SIP Subscribe message to the mobile station 112 to indicate to the mobile station 112 that cross-domain deregistration in the circuit-switched service domain 102 can be performed using a Notify message. The Notify message sent at 202 includes a deregistration request, where the deregistration request is a circuit-switched deregistration request. More specifically, according to one example, the deregistration request is a 1xRTT deregistration request to deregister the mobile station in the circuit-switched service domain 102. The Notify message also contains an identifier of the mobile station, such as in the form of a mobile directory number (MDN) or other identifier. In response to the Notify message sent at 202, the VCC AS sends (at 204) a registration notification (REGNOT) to the HLR 114. Normally, a registration notification is sent from a serving MSC based on a registration change event of a mobile station. However, in accordance with some embodiments, the REGNOT request is sent by the VCC AS, or some other network element in the packet-switched service domain 100, to the HLR 114. The registration notification contains the identifier (e.g., MDN) of the mobile station 112 that is involved in the registration notification. The registration notification request sent from the VCC AS to the HLR 114 indicates that the VCC AS is to be the serving controller for the mobile station 112 (rather than the MSC 134 being the serving controller).

In response to the REGNOT request sent at 204, the HLR 114 sends (at 206) a registration cancellation (REGCANC) request to the currently active serving MSC 134 to indicate to the serving MSC 134 that service to the mobile station 112 is to no longer be provided by the serving MSC 134. The serving MSC 134 responds (at 208) with a regcanc message (an acknowledge of REGCANC) to the HLR 114. In response to the regcanc message, the HLR 114 sends (at 210) a regnot message to the VCC AS, where the regnot message acknowledges the REGNOT message sent at 204. The regnot message received by the VCC AS is an acknowledgment that the VCC AS is now the service controller for the mobile station 112. In response to this acknowledgment (regnot) 210, the VCC AS sends (at 212) an MSINACT (mobile station inactivate) message to effect deregistration of the mobile station in the HLR 114. The HLR 114 acknowledges the MSINACT message with a msinact message sent (at 214) to the VCC AS.

In the foregoing, it is noted that the format of the REGNOT, REGCANC, and MSINACT messages have not been changed from what is defined by the relevant standards (e.g., ANSI (American National Standards Institute)-41). However, in the case of the REGNOT message sent at 204, the source of the REGNOT message differs from what is conventionally the source of such a REGNOT message.

Upon receipt of msinact at 214, the VCC AS acknowledges the SIP Notify message (202) by sending (at 216) a SIP 200 OK message to the mobile station. At this point, the mobile station has been deregistered in the circuit-switched service domain 102 (although the mobile station remains registered in the packet-switched service domain 100).

Figure 3:
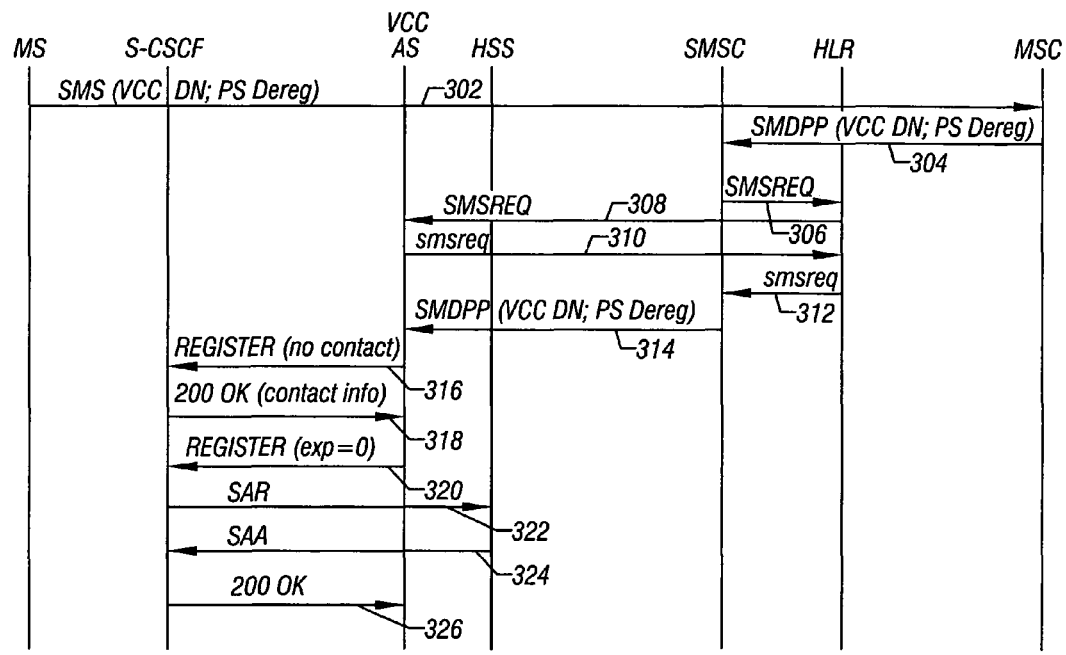
FIG. 3 is a message flow diagram of a procedure to deregister the multi-mode mobile station in the packet-switched service domain using a circuit-switched access network, according to an embodiment.

According to one embodiment, FIG. 3 shows cross-domain deregistration in the packet-switched service domain 100 by the mobile station 112 sending a deregistration request through the circuit-switched service domain 102. In this scenario, the mobile station has detected a condition that indicates that deregistration should be performed in the packet-switched service domain 100, but the mobile station 112 has lost connection to the packet-switched access network 106 so that deregistration over the packet-switched access network is not available. To perform this cross-domain deregistration, the mobile station sends (at 302) an SMS message that contains a packet-switched deregistration request and that contains the directory number (or other identifier) of the VCC AS (referred to as VCC DN). Note that the packet-switched deregistration request also contains the mobile directory number (MDN) or other identifier of the mobile station. The SMS message is sent through the circuit-switched access network 108 to the serving MSC 134. Note that the deregistration request can be provided as a field in the SMS message.

In response to the SMS message at 302, the serving MSC 134 sends an SMDPP (short message service delivery point-to-point) message (at 304) to the SMSC 138. In this example call flow, the SMSC 138 is in the circuit-switched core network 108. In an alternative implementation, the SMSC 138 can be implemented as an SMS gateway in the multimedia network 104 (such that the SMDPP message is sent to the SMS gateway in the multimedia network 104 instead of an SMSC in the circuit-switched core network). The SMDPP message is used for requesting SMS message transmission, with the SMDPP message containing the SMS message (in this case, the message containing the VCC DN and the packet-switched deregistration request). In some embodiments, the SMDPP message is based on the Mobile Application Part (MAP) protocol to enable signaling exchanges with an HLR, such as the HLR 114 in the circuit-switched service domain 102. In response to the SMDPP message, the SMSC 138 sends (at 306) an SMSREQ (SMS request) message, where the SMSREQ message is sent to the HLR 114 to retrieve the SMS address of the VCC AS (that corresponds to the VCC DN in the SMDPP message). The SMS address of the VCC AS is referred to as the VCC SMS address, which can be a point code subscription number on an SS7 network, for example.

In response to the SMSREQ message at 306, the HLR 114 sends (at 308) an SMSREQ message to the VCC AS, and the VCC AS responds (at 310) with a smsreq message that contains the VCC SMS address. In response, the HLR 114 sends (at 312) an smsreq message to the SMSC 138 with the VCC SMS address. Upon receipt of the VCC SMS address, the SMSC 138 now knows where to send the SMDPP message containing the VCC DN and the packet-switched deregistration request. The SMSC 138 thus forwards (at 314) the SMDPP message to the VCC SMS address. Note that the SMDPP message received by the VCC AS is a form of SMS message.

Upon receipt of the SMDPP message at 314, the VCC AS sends (at 316) a SIP Register message (to the S-CSCF 120), with the Register message containing no contact information. A Register message with no contact information indicates to the recipient (in this case the S-CSCF) that the recipient is to provide a list of all devices associated with the mobile directory number (or other identifier of a subscriber) that was originally communicated in the packet-switched deregistration request. For example, a particular mobile directory number can be associated with multiple different terminals, including a multi-mode mobile station, a personal computer, and other devices. The S-CSCF responds with a 200 OK message (at 318) that contains contact information for the mobile directory number or other identifier of the subscriber, which includes a list of all terminals associated with the particular mobile directory number. The VCC AS selects the multi-mode mobile station device from the list of devices, and sends (at 320) a Register message to the address (IP address) of the multi-mode mobile station, with the indication "expires=0" to indicate that the mobile station is to be deregistered in the packet-switched service domain 100. Upon receipt of the Register message at 320, the S-CSCF 120 sends (at 322) a server assignment request (SAR), as defined by the IMS standards, to the HSS 116. The SAR message indicates to the HSS 116 that deregistration of the mobile station is to be performed by the HSS. The HSS 116 acknowledges (at 324) the SAR message with a server assignment answer (SAA) message back to the S-CSCF, which responds by sending (at 326) a SIP 200 OK message to the VCC AS. The flow continues with further acknowledgments (not shown) that propagate back to the mobile station, at which point the mobile station is confirmed to have been deregistered in the packet-switched service domain.

In the call flows of FIGS. 2 and 3, the deregistration service node (part of the VCC AS in the depicted example implementation) receives deregistration requests originated by the multi-mode mobile station. In FIG. 2, a circuit-switched deregistration request originated by the mobile station and sent through the packet-switched access network is received by the deregistration service node. In FIG. 3, a packet-switched deregistration originated by the multi-mode mobile station and sent through the circuit-switched access network is received by deregistration service node (indirectly through the MSC 134 and SMSC 138). Although FIGS. 2 and 3 illustrate two example flows for performing cross-domain deregistration on behalf of a multi-mode mobile station, it is noted that other message flows can be employed in other embodiments.

Figure 4:
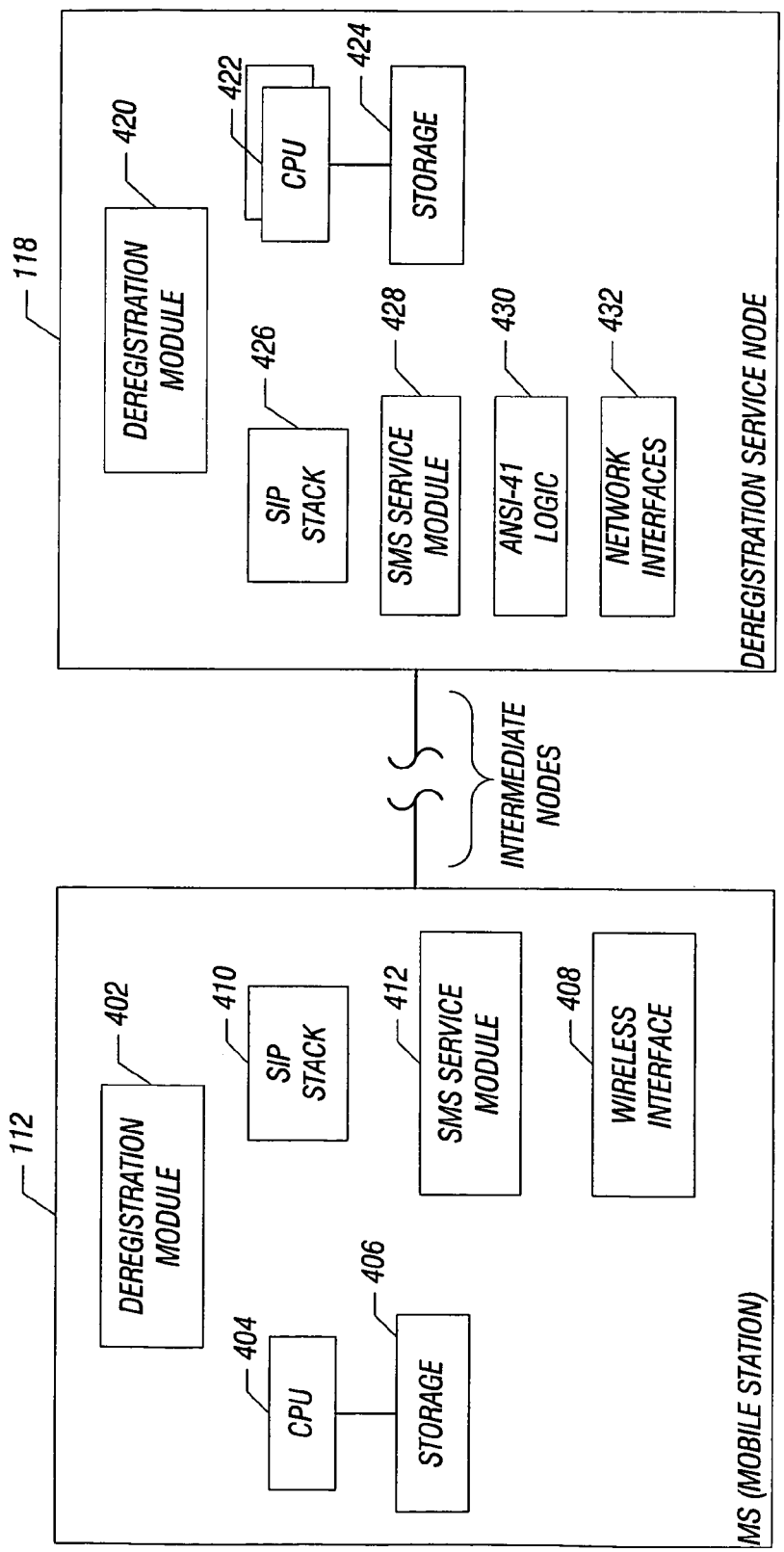
FIG. 4 is a block diagram of components in a multi-mode mobile station and a deregistration service node, in accordance with an embodiment.

FIG. 4 illustrates components in the mobile station 112 and the deregistration service node 118 (which in some embodiments can be part of the VCC AS). However, in FIG. 4, the deregistration service node 118, which resides in the multimedia network 104, is depicted by itself.

FIG. 4 shows that intermediate nodes (including those depicted in FIG. 1) enable communication, either direct communication or indirect communication, between the mobile station 112 and the deregistration service node 118. An example of direct communication is the mobile station sending a SIP Notify message (202 in FIG. 2) to the deregistration service node 118 over the packet-switched access network 106 and one or more control functions, such as the S-CSCF 120, in the multimedia network 104. An example of indirect communication between the mobile station 112 and deregistration service node 118 is the SMS message (302 in FIG. 3) sent by the mobile station to the serving MSC over the circuit-switched access network 110, which in turn sends an SMDPP message (304) to the SMSC 138, which in turn forwards the SMDPP message (314) to the deregistration service node 118.

The mobile station 112 includes a deregistration control module 402 (which can be implemented with software) that is executable on a central processing unit (CPU) 404 of the mobile station 112. The CPU 404 is coupled to a storage 406, which can store data and software instructions in the mobile station 112.

The mobile station 112 also includes a wireless interface 408 to communicate over a wireless link (such as an RF link). Additionally, the mobile station 112 has a SIP stack 410 for processing (generating or receiving) SIP messages, including the SIP Subscribe, SIP Notify, and SIP 200 OK messages mentioned above. The mobile station 112 also includes an SMS service module 412 to handle SMS messages, including sending of the SMS message in FIG. 3 (302) to the serving MSC 134 over the circuit-switched access network 110.

The deregistration service node 118 similarly includes a deregistration control module 420 that is executable on one or more CPUs 422. The one or more CPUs are attached to a storage 424. The deregistration service node 118 further includes a SIP stack 426 (for processing SIP messages), an SMS service module 428 (for processing SMS messages), and ANSI-41 logic 430 (for processing ANSI-41 messages to interact with the HLR 114 in the circuit-switched core network 108). Note that the ANSI-41 logic 430 can be located outside the deregistration service node 118 in another implementation. Additionally, the deregistration service node includes network interfaces 432 to enable communication with nodes in both the multimedia network 104 and the circuit-switched core network 108.

Although example components are discussed above and depicted in FIG. 4, it is noted that different components can be employed in other embodiments.

Instructions of the various software modules discussed herein (e.g., deregistration control modules 402 and 420 in FIG. 4) are loaded for execution on corresponding processors (such as CPUs 404 and 422 in FIG. 4). Processors include microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of some embodiments.

What is claimed is:

1. A method, comprising:
    determining that a mobile station registered in a first type service domain and a second, different type service domain is to be deregistered in the second type service domain, wherein the mobile station has access to the first type service domain but not the second type service domain; and
    in response to the determining, sending a deregistration request through the first type service domain, the deregistration request indicating that the mobile station is to be deregistered in the second type service domain,
    wherein the first type service domain is one of a circuit-switched service domain and packet-switched service domain, and the second type service domain is the other one of the circuit-switched service domain and the packet-switched service domain.

2. The method of claim 1, wherein determining that the mobile station is to be deregistered in the second type service domain comprises detecting a trigger including one of: disabling a radio interface of the mobile station to the second type service domain; powering down of the mobile station; loss of wireless connection to the second type service domain; and an event for controlling a method of service delivery to the mobile station.

3. The method of claim 1, wherein the first type service domain is the circuit-switched service domain, and the second type service domain is the packet-switched service domain,
    wherein sending the deregistration request comprises sending the deregistration request in a short message service (SMS) message to a mobile switching center in the circuit-switched service domain.

4. The method of claim 3, further comprising providing an identifier of an application server in the packet-switched service domain in the SMS message.

5. The method of claim 1, wherein the first type service domain is the packet-switched service domain, and wherein the second type service domain is the circuit-switched service domain,
    wherein sending the deregistration request comprises sending the deregistration request in a Session Initiation Protocol (SIP) message to a node in the packet-switched service domain.

6. The method of claim 5, wherein sending the deregistration request in the SIP message comprises sending the deregistration request in a SIP Notify message.

7. The method of claim 5, wherein sending the deregistration request in the SIP message to the node comprises sending the deregistration request in the SIP message to a voice continuity control application server.

8. The method of claim 1, wherein the mobile station is configured to provide a Session Initiation Protocol (SIP) stack and a short message service (SMS) module, and wherein sending the deregistration request comprises sending the deregistration request in a message provided by one of the SIP stack and the SMS module.

9. The method of claim 1, further comprising:
    determining that the mobile station has transferred to the second type service domain;
    after transfer of the mobile station to the second type service domain, determining that the mobile station is to be deregistered in the first type service domain; and in response to determining that the mobile station is to be deregistered in the first type service domain, sending a second deregistration request over the second type service domain, the second deregistration request indicating that the mobile station is to be deregistered in the first type service domain.

10. An article comprising at least one non-transitory storage medium containing instructions that when executed cause a node in a packet-switched service domain to:
receive a deregistration request originated by a multi-mode mobile station registered in a packet-switched service domain and a circuit-switched service domain, wherein the mobile station has access to a first one of the packet-switched service domain and the circuit-switched service domain but not the other one of the packet-switched service domain and the circuit-switched service domain, and wherein the deregistration request indicates deregistration of the mobile station in the other one of the packet-switched service domain and the circuit-switched service domain.

11. The article of claim 10, wherein the deregistration request is originated by the multi-mode mobile station having access to the packet-switched service domain, and wherein receiving the deregistration request comprises receiving a Session Initiation Protocol (SIP) message that indicates that the mobile station is to be deregistered in the circuit-switched service domain.

12. The article of claim 10, wherein the deregistration request is originated by the multi-mode mobile station having access attached to the packet-switched service domain, and wherein receiving the deregistration request comprises receiving a 1xRTT deregistration request.

13. The article of claim 10, wherein the deregistration request is originated by the multi-mode mobile station having access to the packet-switched service domain, and wherein the instructions when executed cause the node to further send a registration notification to a home location register (HLR) in the circuit-switched service domain in response to the deregistration request.

14. The article of claim 13, wherein the registration notification is an indication to the HLR that the node in the packet-switched service domain is to be the serving controller for the multi-mode mobile station instead of a currently active serving mobile switching center (MSC).

15. The article of claim 10, wherein the deregistration request is originated by the multi-mode mobile station having access to the packet-switched service domain, and wherein the instructions when executed cause the node to further:

after receiving the deregistration request, send a request to inactivate the mobile station to a home location register (HLR) in the circuit-switched service domain.

16. The article of claim 15, wherein sending the request to inactivate comprises sending an ANSI-41 MSINACT request.

17. The article of claim 10, wherein the deregistration request is originated by the multi-mode mobile station having access to the circuit-switched service domain, and wherein receiving the deregistration request comprises receiving a short message service (SMS) message that indicates that the mobile station is to be deregistered in the packet-switched service domain.

18. The article of claim 17, wherein the instructions when executed cause the node to further:
send a Session Initiation Protocol (SIP) Register message in the packet-switched service domain in response to the deregistration request of the received SMS message.

19. A node, comprising:
a processor;
a non-transitory computer-readable medium including instructions executable on the processor to implement a deregistration module configured to:
receive a deregistration request originated by a multi-mode mobile station registered in a packet-switched service domain and a circuit-switched service domain, the mobile station having access to a first one of the packet-switched service domain and the circuit-switched service domain but not the other one of the packet-switched service domain and the circuit-switched service domain, wherein the deregistration request indicates deregistration of the mobile station in the other one of the packet-switched service domain and circuit-switched service domain.

20. The node of claim 19, wherein the deregistration request is contained in one of a Session Initiation Protocol (SIP) message and a short message service (SMS) message.

21. A method, comprising:
receiving a deregistration request originated by a multi-mode mobile station registered in a packet-switched service domain and a packet-switched service domain, wherein the mobile station has access to a first one of the packet-switched service domain and the circuit-switched service domain but not the other one of the packet-switched service domain and the circuit-switched service domain, and wherein the deregistration request indicates deregistration of the mobile station in the other one of the packet-switched service domain and the circuit-switched service domain.

* * * * *

UNITED STATES PATENT AND TRADEMARK OFFICE
CERTIFICATE OF CORRECTION

| | | |
|---|---|---|
| PATENT NO. | : 8,665,862 B1 | Page 1 of 1 |
| APPLICATION NO. | : 11/585735 | |
| DATED | : March 4, 2014 | |
| INVENTOR(S) | : Mark A. Stegall | |

It is certified that error appears in the above-identified patent and that said Letters Patent is hereby corrected as shown below:

In the Claims:

Claim 12, Column 11, Line 30, please delete "access attached" and substitute -- access --

Claim 21, Column 12, Line 41, please delete "packet-switched" and substitute -- circuit-switched --

Signed and Sealed this
Seventeenth Day of June, 2014

Michelle K. Lee
*Deputy Director of the United States Patent and Trademark Office*